(12) United States Patent
Jiang et al.

(10) Patent No.: US 12,218,924 B2
(45) Date of Patent: *Feb. 4, 2025

(54) SEGMENTATION OF ENCRYPTED SEGMENTS IN NETWORKS

(71) Applicant: NICIRA, INC., Palo Alto, CA (US)

(72) Inventors: Wenyi Jiang, Palo Alto, CA (US); Daniel G. Wing, Palo Alto, CA (US); Bin Qian, San Jose, CA (US); Dexiang Wang, Sunnyvale, CA (US)

(73) Assignee: NICIRA, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/450,345

(22) Filed: Aug. 15, 2023

(65) Prior Publication Data

US 2023/0396598 A1    Dec. 7, 2023

Related U.S. Application Data

(63) Continuation of application No. 17/458,969, filed on Aug. 27, 2021, now Pat. No. 11,729,155, which is a continuation of application No. 15/796,656, filed on Oct. 27, 2017, now Pat. No. 11,108,751.

(51) Int. Cl.
*H04L 9/40* (2022.01)
*H04L 47/36* (2022.01)
*H04L 69/22* (2022.01)
*H04L 69/324* (2022.01)

(52) U.S. Cl.
CPC .......... *H04L 63/0485* (2013.01); *H04L 47/36* (2013.01); *H04L 63/029* (2013.01); *H04L 69/22* (2013.01); *H04L 69/324* (2013.01)

(58) Field of Classification Search
CPC ... H04L 63/0485; H04L 63/029; H04L 69/22; H04L 69/324; H04L 47/36
See application file for complete search history.

(56) References Cited

U.S. PATENT DOCUMENTS

| 6,263,396 | B1 * | 7/2001 | Cottle | H04N 21/42653 348/E5.005 |
| 2003/0142823 | A1 * | 7/2003 | Swander | H04L 69/16 380/277 |
| 2004/0205336 | A1 * | 10/2004 | Kessler | H04L 63/164 713/160 |

(Continued)

*Primary Examiner* — Khoi V Le
(74) *Attorney, Agent, or Firm* — King Intellectual Asset Management

(57) ABSTRACT

A first host receives a packet from a first compute node for a second compute node of a second host. The payload is larger than a maximum transmission unit size. The first packet is encapsulated with an outer header. The first host analyzes a length of at least a portion of the outer header in determining a size of an encrypted segment of the payload. Then, the first host forms a plurality of packets where each packet in the packets includes an encrypted segment of the payload, a respective encryption header, and a respective authentication value. The payload of the first packet is segmented to form a plurality of encrypted segments based on the size. The first host sends the packets to the second host and receives an indication that a packet was not received. A second packet including the encrypted segment is sent to the second compute node.

21 Claims, 10 Drawing Sheets

(56) References Cited

U.S. PATENT DOCUMENTS

| | | | |
|---|---|---|---|
| 2005/0135419 A1* | 6/2005 | Pullen | H04L 49/3072 |
| | | | 370/473 |
| 2006/0029102 A1* | 2/2006 | Abe | H04L 69/16 |
| | | | 370/474 |
| 2007/0098007 A1* | 5/2007 | Prodan | H04N 7/17309 |
| | | | 348/E7.07 |
| 2007/0223472 A1* | 9/2007 | Tachibana | H04L 47/36 |
| | | | 370/473 |
| 2008/0310452 A1* | 12/2008 | Vedantham | H04W 28/06 |
| | | | 370/474 |
| 2013/0329557 A1* | 12/2013 | Petry | H04L 41/00 |
| | | | 370/235 |
| 2016/0127520 A1* | 5/2016 | Tewari | H04L 63/0272 |
| | | | 370/392 |

\* cited by examiner

SEGMENTATION OF ENCRYPTED SEGMENTS IN NETWORKS

CROSS REFERENCE OF RELATED APPLICATION

This application is a continuation of U.S. patent application Ser. No. 17/458,969, filed Aug. 27, 2021, entitled "Segmentation of Encrypted Segments in Overlay Networks", which is a continuation of U.S. patent application Ser. No. 15/796,656, filed Oct. 27, 2017, entitled "Segmentation of Encrypted Segments in Overlay Networks", now U.S. Pat. No. 11,108,751, each of which is incorporated in its entirety.

BACKGROUND

A sender data compute node, such as a virtual machine (VM), of a sender host sends packets that are first handled by a sender host. In some instances, the sender data compute node may send out jumbo packets, which are larger than a maximum transmission unit (MTU) size that governs a maximum size of packets that the host can send intact to a destination node. For instance, if the payload length in a jumbo packet is 5840 bytes and the MTU size is 1500 bytes, the sender host can perform segmentation to divide the payload of the jumbo packet into smaller segments that fit into the MTU size. In this case, the single jumbo packet may be segmented into four packets.

In some instances, the sender host may encrypt the payload of the jumbo TCP packet. For example, the sender host may encrypt the entire 5840 bytes of the payload. In addition to the encrypted payload, the sender host inserts an encryption header and also an authentication value in the payload. The authentication value may be a signature that is used to verify the encrypted payload has not been corrupted. Then, the sender host segments the encrypted payload into four packets where a first packet may include the encryption header and then the last packet includes the authentication value. The second packet and the third packet do not include the encryption header or the authentication value.

When the packets are sent to the destination host, one or more of the packets may be lost during transmission. For example, the destination host may not receive the second packet. Because some of the data is missing, the destination host cannot decrypt the entire payload successfully because in order to decrypt the encrypted payload, all of the segments must be re-assembled correctly. This is because the authentication value located in the fourth packet is the signature for the entire 5840 byte encrypted payload. If one segment of the encrypted payload is missing, then the destination host cannot verify the signature of the decrypted payload. As a result, the destination data compute node will not receive any decrypted data and thus the destination data compute node will not send any acknowledgements to the sender data compute node. When this occurs, the sender data compute node has to re-send all the data in the 5840 byte payload again, which is not efficient.

DETAILED DESCRIPTION

Figure 1:
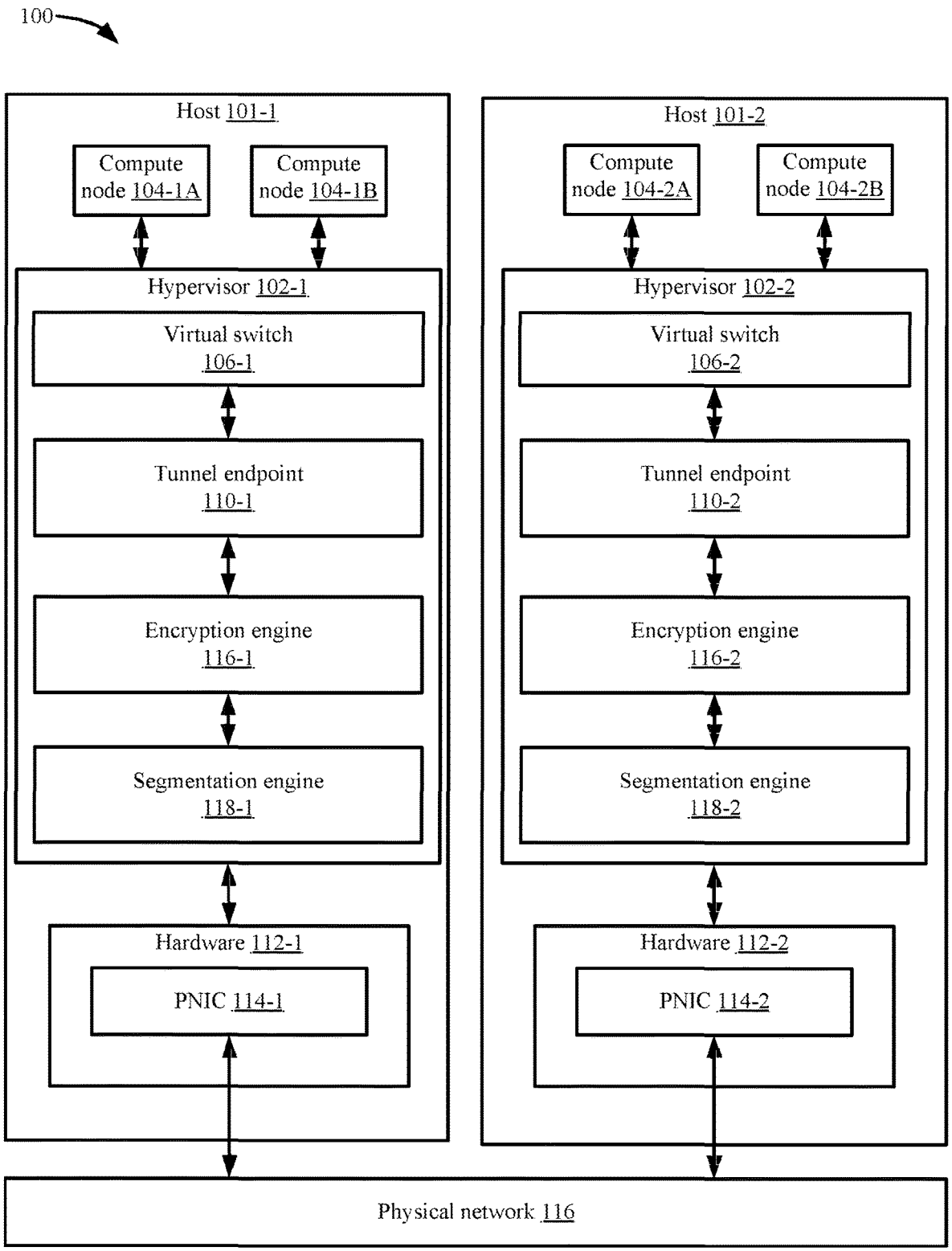
FIG. 1 depicts a system that includes a sender host and a destination host according to some embodiments.

Described herein are techniques for an encryption/decryption system. In the following description, for purposes of explanation, numerous examples and specific details are set forth in order to provide a thorough understanding of some embodiments. Some embodiments as defined by the claims may include some or all of the features in these examples alone or in combination with other features described below, and may further include modifications and equivalents of the features and concepts described herein.

Some embodiments handle packet loss efficiently by only re-transmitting the segment of payload that is lost due to any packet loss when a packet (e.g., jumbo packet) is split into multiple packets. A sender host receives a payload that is bigger than a maximum transmission unit (MTU) size and instead of encrypting the payload into a single encrypted segment with a single encryption header and single authentication value, the sender host encrypts segments of the payload individually. Each segment includes an encryption header and authentication value, which allows a destination host to decrypt each of the segments individually and independently. Thus, if one of the packets is lost, the destination host can still decrypt the segments in the received packets without any problems because each packet includes its own individual encryption header and authentication value. This is in contrast to the process described in the Background in which the entire payload was encrypted together and one missing packet would not allow the destination host to decrypt the payload received without the missing segment.

Once receiving the segments of the payload and decrypting them, the destination host can then assemble and forward the decrypted segments to a destination data compute node. The destination data compute node reviews the received data in the segments and can send selective acknowledgements (SACKs) to the sender data compute node indicating which data was received. The sender data compute node can then re-transmit only the segments of the payload that were lost and not the other segments that were received. Not having to retransmit the whole payload saves network bandwidth and processing power. Network bandwidth is saved because segments that were already received are not re-sent. Also, processing resources are saved because segments of payload that was already received do not need to be re-encrypted and sent again.

When overlay networks are used, the sender host receives a packet with an inner header directing the packet to a destination data compute node, and adds an outer header to the packet directing the packet to a tunnel endpoint in the destination host. When jumbo packets are received, the sender host needs to dynamically calculate where to segment the payload because the inner header, outer header, encryption headers, and authentication values may vary in length, which means that payloads for different jumbo packets received from data compute nodes may be segmented at different boundaries. For example, some encapsulation protocols include variable length fields. As will be discussed in more detail below, the sender host calculates where to segment the payload such that the payload is segmented at the correct boundaries.

FIG. 1 depicts a system 100 that includes a sender host 101-1 and a destination host 101-2 according to some embodiments. Sender host 101-1 includes sender compute nodes 104-1A to 104-1B that can communicate with destination compute nodes 104-2A to 104-2B in destination host 101-2.

Hosts 101-1 and 101-2 may include respective hardware 112-1 and hardware 112-2, and virtualization software (e.g., hypervisor 102-1 and hypervisor 102-2) to support various data compute nodes 104-1A and 104-1B, and 104-2A and 104-2B, respectively. Although two hosts 101-1 and 101-2 are shown, any number of hosts (also known as computing devices, host computers, host devices, host systems, physical servers, service systems, etc.) where each host may support any number of date compute nodes may be used in system 100. In some embodiments, hypervisors 102-1 and 102-2 provide software defined networking functionality, to place compute nodes 104 on logical overlay networks as further described below. In other embodiments, the process of segmenting the jumbo packets as described may be used with hypervisors that segments jumbo packets without using overlay networks. Furthermore, instead of hypervisors, packet segmentation may be implemented by an operating systems network stack or some other component in the data path of the network communication that also provides encryption services or is operating in conjunction with a component providing encryption services, preferably at or near the edge of the network.

In the embodiment described below, compute nodes 104 may refer to virtual machines (VMs) that are running on a respective host, but this is one example of a virtualized computing instance or workload. Any suitable technology may be used to provide a compute node. Compute nodes may include not only virtual machines, but also containers (e.g., running on top of a host operating system without the need for a hypervisor or separate operating system or implemented as an operating system level virtualization), virtual private servers, client computers, etc. The compute nodes may also be complete computation environments containing virtual equivalents of the hardware and software components of a physical computing system. Also, as used herein, the term hypervisor may refer generally to a software layer or component that supports the execution of multiple compute nodes including system-level software that supports name space containers. Also, although compute nodes 104 are shown as being part of hosts 101, compute nodes 104 may be separate physical devices from the components that perform the encapsulation, decapsulation, segmentation, and decryption. For instance, tunnel endpoint 110, encryption engine 116, and segmentation engine 118 may be located in a separate physical device from compute node 104.

In one embodiment, compute nodes 104-1A/104-1B to 104-2A/104-2B belong to a software-defined logical overlay network implemented in system 100. Hypervisors 102-1 and 102-2 include a virtual switch 106-1 and a virtual switch 106-2, respectively, to handle traffic forwarding (e.g., packets) between compute nodes of host 101-1 and compute nodes of host 101-2. Virtual switches 106-1 and 106-2 implement software-defined network functionality by creating overlay networks on which compute nodes reside. Communication between compute nodes on different hosts is provided by way of a tunnel formed between tunnel endpoints 110-1 and 110-2 in which the packets are sent. A tunnel may generally refer to an end-to-end, bi-directional path between a pair of tunnel endpoints 110. The overlay network uses addresses of tunnel endpoints 110-1 and 110-2 to send encapsulated packets across intervening physical network 116. Tunnel endpoints 110-1 and 110-2 encapsulate packets with an outer header and decapsulate the packets to remove the outer header. The outer header identifies the addresses of tunnel endpoints 110-1 and 110-2, which the hypervisor uses to send the encapsulated packet through the tunnel.

Hypervisors 102-1 and 102-2 include virtual switches 106-1 and 106-2, tunnel endpoints 110-1 and 110-2, encryption engines 116-1 and 116-2, and segmentation engines 118-1 and 118-2, respectively. These components may be part of an input/output chain in hypervisors 102-1 and 102-2 to process packets being sent to and from compute nodes 104. Although these components are depicted as being coupled together, it will be understood that some or all of the components may be part of virtual switch 106 or may be separate software entities.

Tunnel endpoints 110-1 and 110-2 may be part of virtual switch 106-1 and virtual switch 106-2, respectively. However, tunnel endpoints 110-1 and 110-2 may also be separate software entities, but can be thought of as an extension of the virtual switch (e.g., part of I/O chain between the virtual switch and a physical network interface (PNIC)) through which the host connects to physical network 116. Also, tunnel endpoints 110-1 and 110-2 may correspond to PNICs 114-1 and 114-2, respectively. PNICs 114 are physical interfaces of hosts 101-1 and 101-2, respectively. Packets from compute nodes 104-1A and 104-1B are output through PNIC 114-1 onto physical network 116 and packets sent from compute nodes 104-2A and 104-2B are sent through PNIC 114-2 onto physical network 116. Physical network 116 may include any suitable number of interconnected network devices, such as layer 3 routers, layer 2 switches, gateway devices, etc. The term "layer 2" may refer generally to a media access control (MAC) layer and "layer 3" may refer to a network or internet protocol (IP) layer in the open system interconnection (OSI) model, although the concepts described herein may use other networking models.

Encryption engines 116-1 and 116-2 may encrypt a payload or decrypt a payload. In some embodiments, the encryption performed may include transport layer security (TLS) encryption, but other protocols may be used, such as secure sockets layer (SSL). For each payload, encryption engine 116-1 generates an encryption header, such as a TLS header that describes the encrypted segment, such as the range of bytes that were encrypted, and an authentication code (e.g., message authentication code (MAC)) that is used to verify the decrypted payload. For example, the authentication code may be a signature (e.g., a hash) of the payload that can be used to verify that the decrypted payload has the same signature.

System 100 may offload segmentation to hypervisor 102-1 and/or PNIC 114-1 instead of having compute nodes 104-1A or 104-1B perform the segmentation. In the example described herein, compute node 104-1A may communicate with compute node 104-2A, but other compute nodes may communicate. Compute node 104-1A sends a jumbo packet that is larger than the maximum size (e.g., MTU size) that can be sent over network 116. Hypervisor 102-1 and/or PNIC 114-1 may then segment the payload of the jumbo packet and send the segments of the payload in multiple packets that comply with the MTU size. Encryption engine 116-1 encrypts segments of the payload in the jumbo packet, and adds encryption headers and authentication values for each segment of the payload. At this point, the jumbo packet includes all the encrypted segments with associated encryption headers and authentication values. Segmentation engine 118-1 then segments the payload of the jumbo packet and generates multiple packets that each include the outer header and individual encrypted segments with a respective encryption header and an authentication value for each segment. Although segmentation engine 118-1 is shown in hypervisor 102-1, segmentation engine 118-1 may also be implemented in hardware, such as in PNIC 114-1. For example, PNIC 114-1 may perform the segmentation as described herein. After the multiple encapsulated packets are created, PNIC 114-1 then sends the packets through physical network 116 to host 102-2.

In host 102-2, virtual switch 106-2 in hypervisor 102-2 receives the encapsulated packets. Tunnel endpoint 110-2 can decapsulate the packets to remove the outer header from the packets. Encryption engine 116-2 can then individually decrypt the encrypted segments included in the packets using the respective encryption header and authentication value for each segment. Segmentation engine 118 combines the segments into a single payload to form the payload from the original packet, which hypervisor 102-2 can then send to data compute node 104-2A using the inner header.

In some instances, compute node 104-1A may send the jumbo packet using a reliable protocol, such as transfer control protocol (TCP). If one or more of the packets are lost during the transmission, the protocol directs compute node 104-1A to resend the missing packets. Given that the segments were encrypted individually, encryption engine 116-2 can still decrypt the individual segments even if one of the segments is lost. In some examples, if packet #2 is lost, segmentation engine 118-2 can still send the decrypted segments from the other packets to compute node 104-2A. Then, compute node 104-2A can determine which segments were received and can send selective acknowledgements for those segments to compute node 104-1. For example, the selective acknowledgements may identify which byte ranges of the payload were received.

When compute node 104-1 receives the selective acknowledgements, compute node 104-1 may re-transmit only the one or more segments of the payload that were lost, which saves network bandwidth usage. Also, in addition to not resending the whole payload, hypervisor 102-1 only has to encapsulate and encrypt the segments that were lost, which saves computing resource usage.

Given that the outer header, original header, encryption headers, and authentication values may be of a variable length, hypervisor 102-1 dynamically calculates where to segment the payload. Hypervisor 102-1 calculates a maximum segment size (MSS) that indicates the maximum payload that is included in a packet. However, the payload will include the encryption headers and authentication values in addition to the encrypted segments. Accordingly, hypervisor 102-1 then calculates a length of an encrypted segment to include in each packet based on the MSS and the length of the encryption headers and authentication values. Setting the MSS value and encrypted segment value correctly allows the host to segment the payload from the jumbo packet at the correct boundaries to meet the MTU size. This process will now be described in more detail.

Sender Host 101-1

Figure 2:
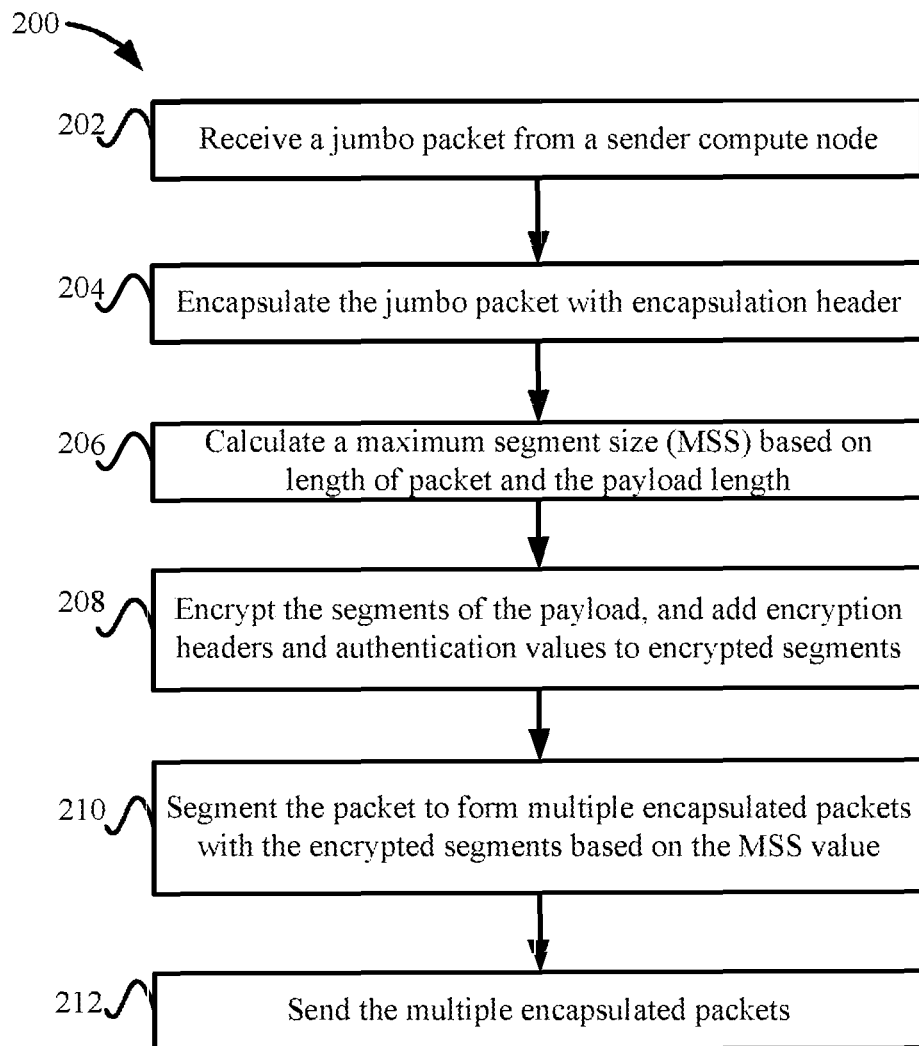
FIG. 2 depicts a simplified flowchart of a method for generating the packets according to some embodiments.
Figure 3A:
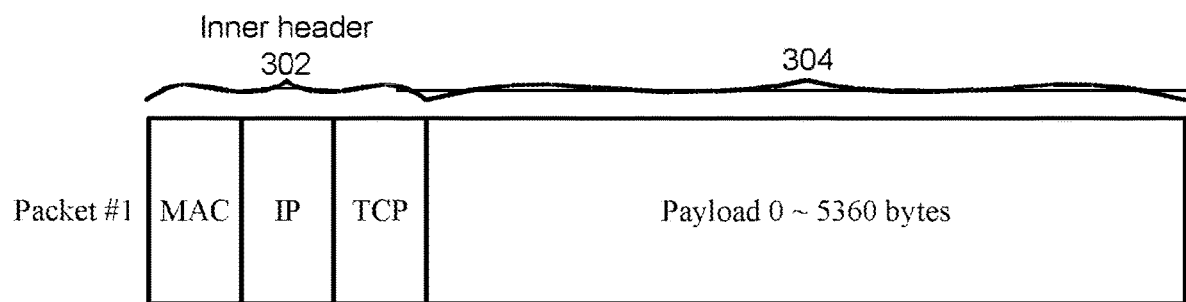
FIGS. 3A to 3E show examples of the packets during the encryption and segmentation processes according to some embodiments.

The following will describe a process flow for sending packets from sender host 101-1 to destination host 101-2. FIG. 2 depicts a simplified flowchart 200 of a method for generating the packets according to some embodiments. FIGS. 3A to 3E show examples of the packets during the encryption and segmentation processes according to some embodiments. In FIG. 2, at 202, virtual switch 106-1 receives a jumbo packet #1 from a data compute node 104-1A. The jumbo packet is a packet that includes a payload that is greater than the MTU size. Referring to FIG. 3A, packet #1 includes an inner header 302 and a payload 304. Inner header 302 is used to deliver the packet to other data compute nodes, such as data compute node 104-2A. In some examples, inner header 302 includes a media access control (MAC) header, an Internet Protocol (IP) header, and a transfer control protocol (TCP) header. The IP header may be a layer 3 header and the MAC header may be a layer 2 header. The MAC header may be a header for the Ethernet frame. The TCP header is for a TCP payload. Although these headers are described, other headers and other protocols may also be appreciated. Also, payload 304 may include a payload that may be larger than the MTU size, such as a payload that is of a length from 0 to around 5360 bytes. It will be understood that payload length may vary, such as some payloads may be larger or smaller than 5360 bytes.

Figure 3B:
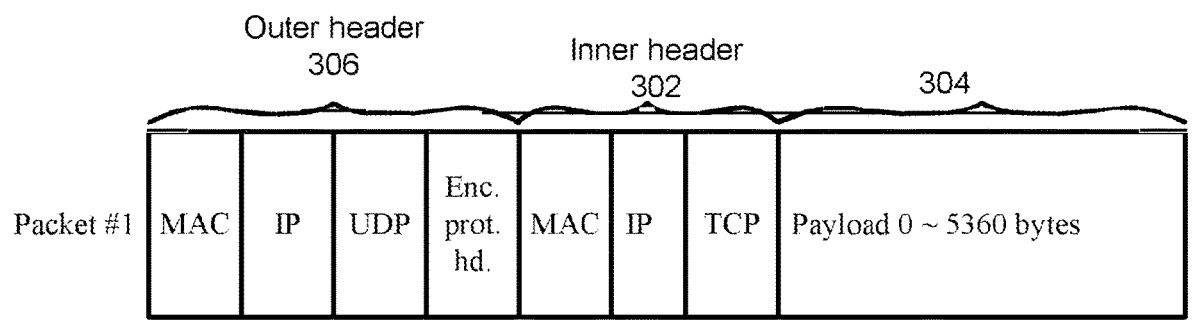

At 204, tunnel endpoint 110-1 encapsulates the jumbo packet #1 with an outer header. As discussed above, hypervisor 102-1 uses the outer header to route the packet to tunnel endpoint 110-2 of hypervisor 102-2, which can then de-capsulate the packet and use the inner header to route the packet to compute node 104-2A. FIG. 3B shows an example of packet #1 after encapsulation according to some embodiments. Tunnel endpoint 110-1 has added an outer header 306 to packet #1 to encapsulate inner header 302 and payload 304. In some embodiments, outer header 306 includes an Internet protocol (IP) header, a user datagram protocol (UDP) header, and an encapsulation protocol header (Enc. prot. hd.). The MAC header is a layer 2 header, the IP header is a layer 3 header, and the UDP header may be the transport layer header that are used to route the packet to destination tunnel endpoint 110-2. UDP is a connectionless protocol that may result in lost packets in contrast to TCP. Although these headers are discussed, other headers may be used depending on the protocols used. For example, different tunneling protocols, generic network virtualization encapsulation (GENEVE), virtual eXtension local area network (VXLAN), stateless transport tunneling (STT), etc., may be used that may result in different encapsulation protocol headers being used. The respective tunneling protocols may include variable length fields that may change the length of the encapsulation protocol header on a per packet basis. For example, for each packet being encapsulated, the encapsulation protocol header may be a different length.

Referring back to FIG. 2, at 206, encryption engine 116-1 (or another process in hypervisor 102-1) calculates an MSS value based on the length of the packet. The MSS value may refer to the value of the payload to include in each packet. This payload includes the encrypted segment of the payload from the jumbo packet, the encryption header, and the authentication value. Encryption engine 116-1 calculates the MSS value per jumbo packet being sent. That is, given that the length of the headers and authentication values may vary, such as the outer header, encryption engine 116-1 performs the following calculation for each jumbo packet.

Figure 4A:
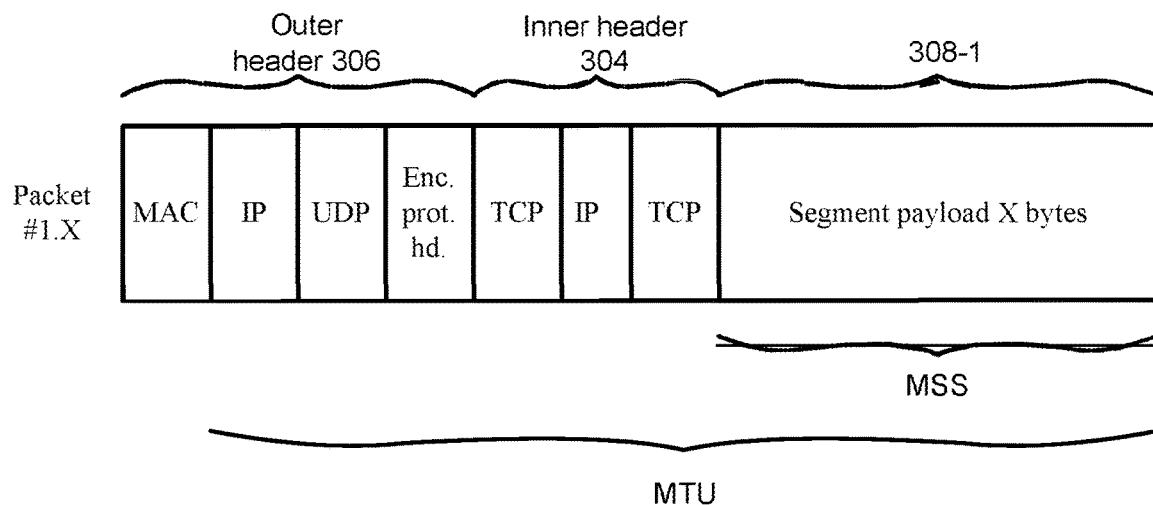
FIGS. 4A and 4B depict an example of determining a maximum segment size and the encrypted segment length using the maximum segment size according to some embodiments.
Figure 4B:
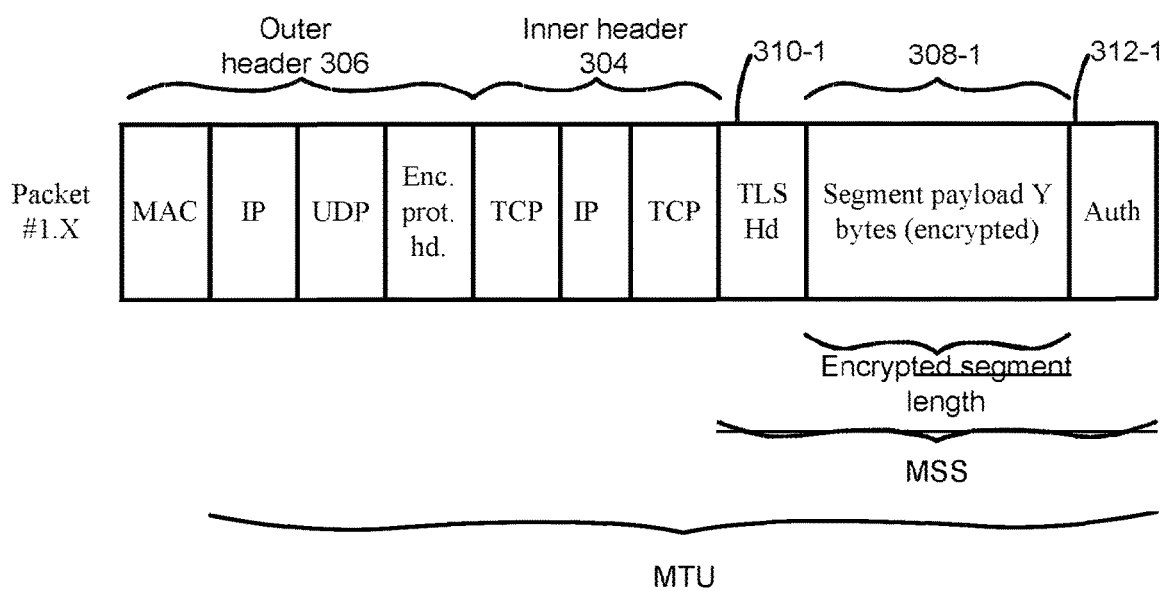

Typically, the MSS value is the MTU size minus the length of the headers that were inserted into packet #1. However, given that an encryption header and an authentication value are also included in the payload of each packet, encryption engine 116-1 takes into account the encryption header and authentication value in determining the length of the encrypted segment to include in each packet. FIGS. 4A and 4B depict an example of determining the MSS value and the encrypted segment length using the MSS value according to some embodiments. In FIG. 4A, packet #1.X is shown conceptually before encryption with outer header 306, inner header 304, and a segment payload of X bytes. Packet 1.X may be one of the multiple packets that will be sent. In some embodiments, the MTU size does not include the MAC header in outer header 306. The MSS value is the MTU value minus (the length of outer header 306 and inner header 304), which is MSS=MTU−(outer header+inner header). If the MTU value is 1500 and, for example, outer header 306 is 60 bytes and inner header 304 is 60 bytes, then MSS=1500−120=1380.

In FIG. 4B, a packet #1.X is one of the packets that includes an encrypted segment. Packet #1.X includes an encryption header (TLS header 310-1) and authentication value (Auth) 312-1. The MTU size includes outer header 306, inner header 304, TLS header 310-1, a payload of Y bytes, and authentication value 312-1. In this example, it maybe be assumed that each individual header in inner header 304 and outer header 306 is 20 bytes (not including the outer MAC header), but it will be understood that these headers may vary in length. Also, because encryption header and authentication value will be inserted in each packet that includes an encrypted segment of the payload, the original MSS value cannot be used to determine the length of the encrypted segment. Rather, encryption engine 116-1 takes into account the length of the encryption header and authentication header to determine an encrypted segment length. In some embodiments, the length of the encryption header and the authentication header is set based on the encryption algorithm used. That is, different encryption algorithms result in different sized encryption headers and authentication values. In other examples, the length of the encryption header and the authentication header varies per jumbo packet received and encryption engine 116-1 can estimate or calculate the length. In this example, if encryption header 310-1 is set at 20 bytes and the authentication value 312-1 is set at 20 bytes, then encryption engine 116-1 determines the encrypted segment length at 308-1 to be the original MSS value−encryption header−authentication value=1380−20−20=1340 bytes. Then, encryption engine 116-1 can segment the original payload into segments of 1340 bytes.

Figure 3C:
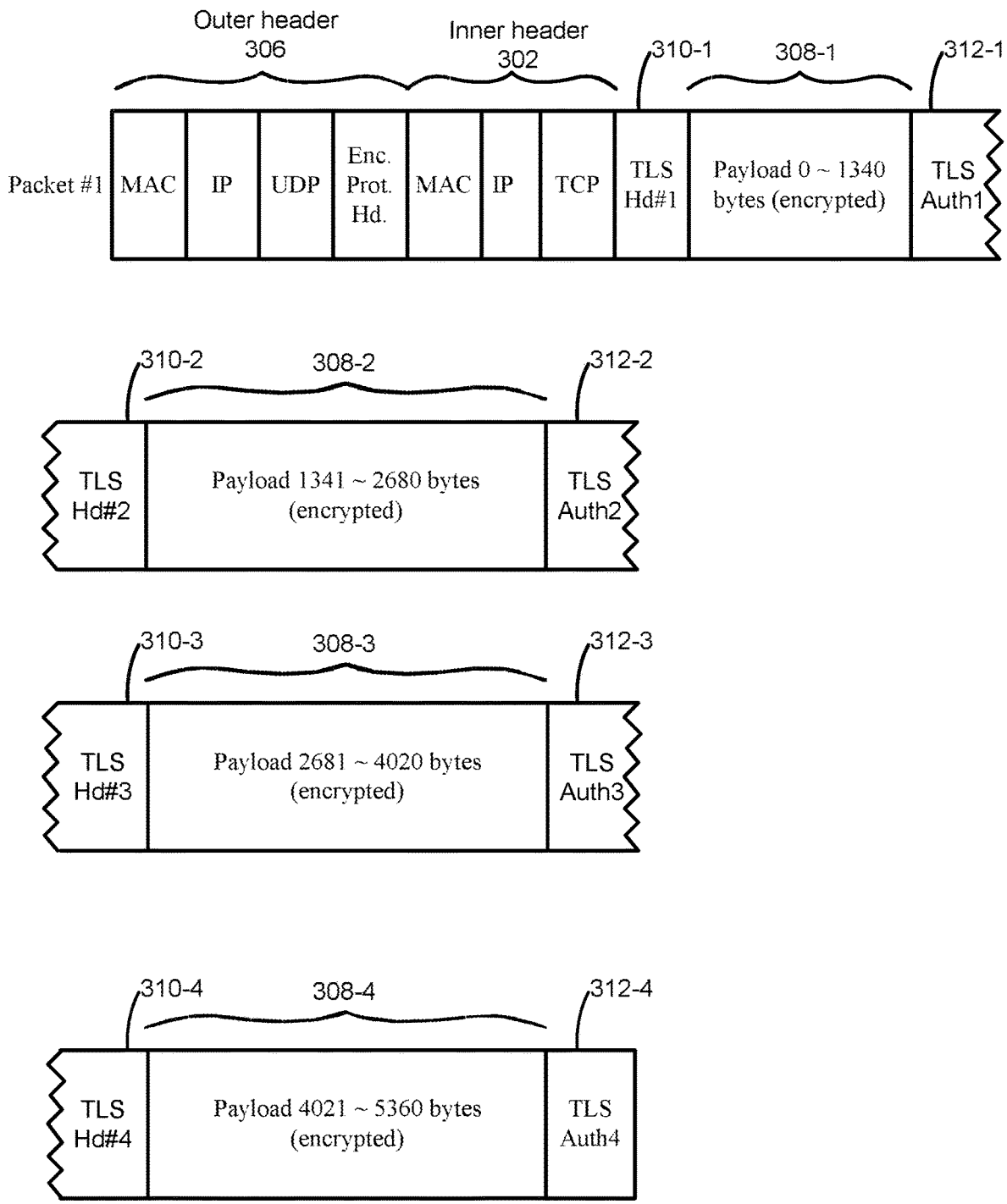

Referring back to FIG. 2, at 208, encryption engine 116-1 encrypts segments of the payload in packet #1 based on the encrypted segment length and then adds encryption headers and authentication values to the encrypted segments. FIG. 3C shows an example of packet #1 with the encrypted segments and encryption headers and authentication values inserted according to some embodiments. The encrypted segments of the payload, encryption headers, and authentication values are inserted into the single jumbo packet #1 in some embodiments. This allows segmentation to be later performed by segmentation engine 118-1 in hypervisor 102-1 or PNIC 114-1. That is, if the payload was segmented first in separate packets, then segmentation by PNIC 114-1 may not be possible. However, in some embodiments, segmentation of the payload of packet #1 into different packets could be performed before encryption, but PNIC 114-1 may not be able to segment the packet in these embodiments.

In packet #1, after outer header 306 and inner header 304, a first encryption header (TLS Hd #1) 310-1 is included to identify that the first encrypted segment from the length 0 to around 1340 bytes at 308-1 is included. Then, the authentication value (TLS Auth1) 312-1 is included for the first encrypted segment. Encryption engine 116-1 calculates TLS Auth1 based on the content of the bytes 0-1340. Then, in a continuation of packet #1, the payload of packet #1 includes a second encryption header 310-2 (TLS Hd #2) for a second segment at 308-2 from the bytes 1341 to around 2680. Then, a second authentication value (TLS Auth2) 310-2 is included that is a signature of the second encrypted segment. Packet #1 continues with a third encryption header (TLS Hd #3) 310-3 for a third encrypted segment from the bytes 2681 to 4020. A third authentication header (TLS Auth3) 312-3 is then included for the third encrypted segment. After the third authentication value, packet #1 includes a fourth encryption header (TLS Hd #4) 310-4 for the fourth encrypted segment at 308-4 from bytes 4021 to around 5360. After the fourth encrypted segment, packet #1 includes a fourth authentication value (TLS Auth4) 312-4 for the fourth encrypted segment.

This example is when the jumbo payload is 5360 bytes. However, the jumbo payload may not always equal 5360 bytes or be a multiple of 1340 bytes. If the payload does not equal 5360 bytes, such as the payload may be less than 5360 bytes (e.g., around 5000 bytes), encryption engine 116-1 may pad the payload with data to bring the length up to 5360 bytes. The extra data may be ignored by compute node 104-2A. Also, although four packets are described, it will be understood the jumbo packet may be segmented into other numbers of packets.

Figure 3D:
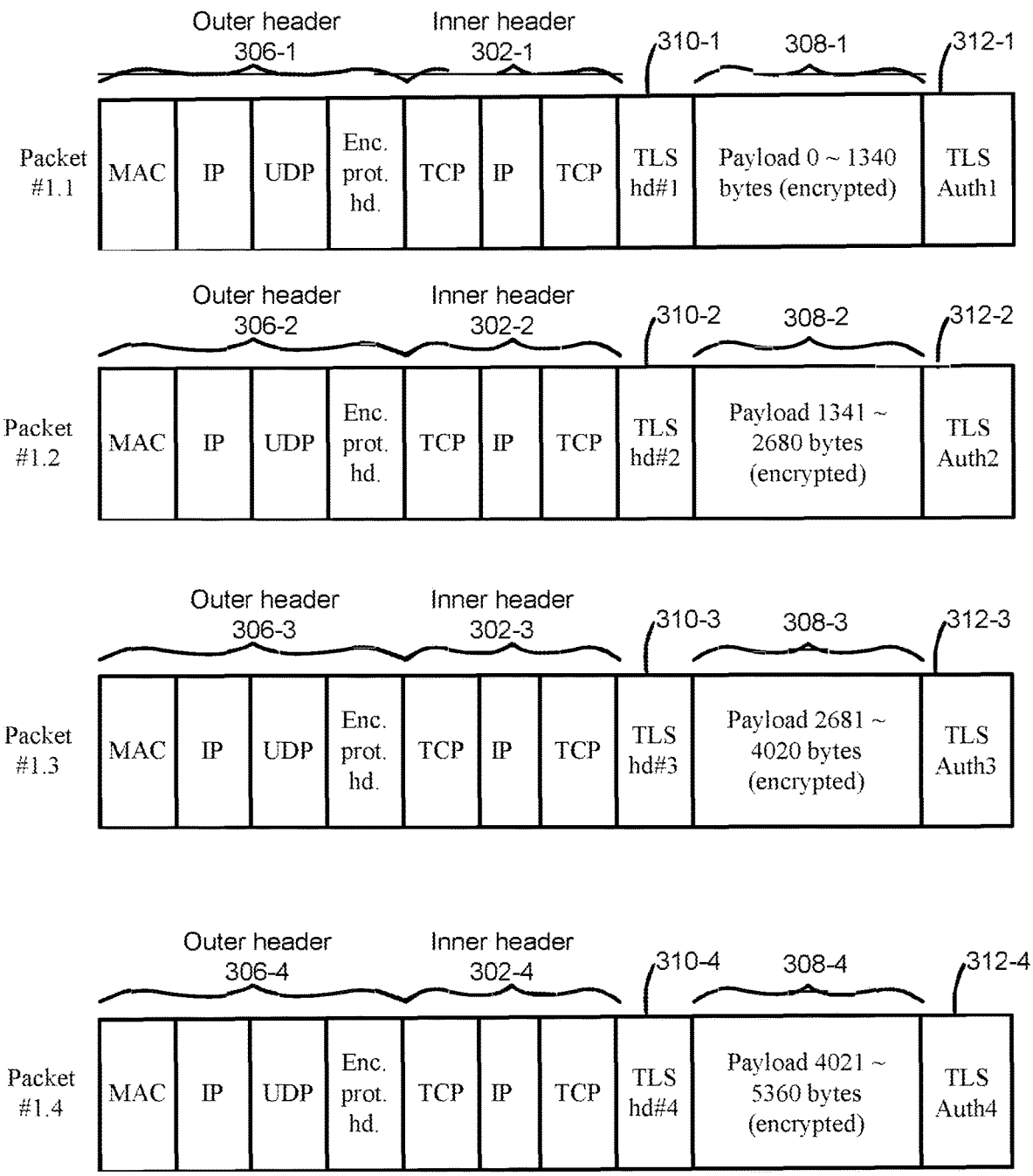
Figure 3E:
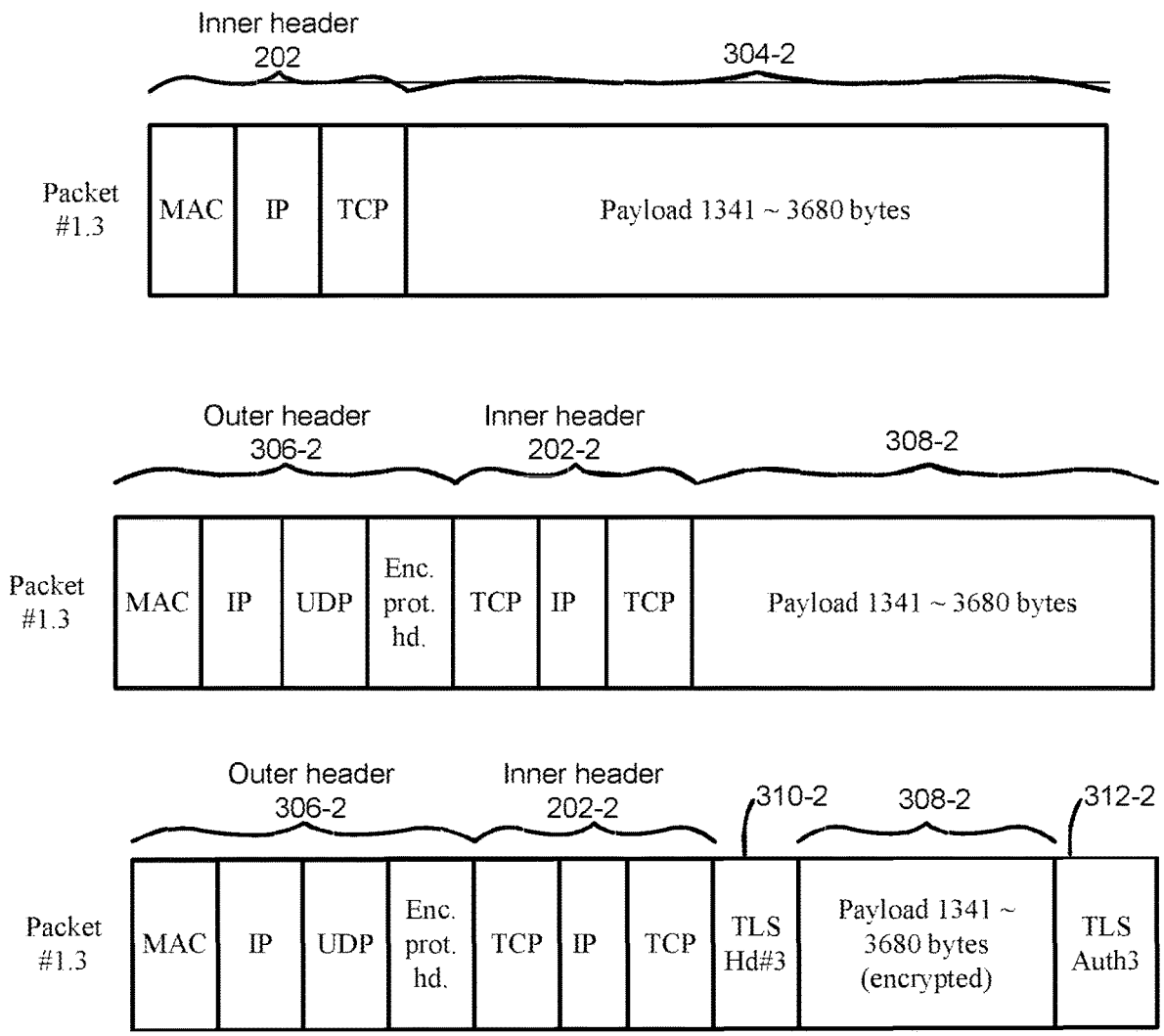

Referring back to FIG. 2, at 210, segmentation engine 118-1 segments packet #1 to form multiple encapsulated packets with the encrypted segments based on the MSS value. Segmentation engine 118-1 may receive the MSS value from encryption engine 116-1 in different ways. For example, the MSS value may be included in metadata or may be inserted in one of the headers of the jumbo packet. FIG. 3D shows an example of the multiple encapsulated packets according to some embodiments. In each packet, segmentation engine 118-1 has added an inner header 302 and an outer header 306. For example, packets #1.1, #1.2, #1.3, and #1.4 include inner headers 302-1 to 302-4 and outer headers 306-1 to 306-4, respectively. The inner and outer headers may be slightly different to identify the segment of the payload included in the packet, but the headers may include the same source and destination information. Further, each packet #1.1 to #1.4 includes a respective encryption header 310-1 to 310-4, a respective encrypted segment 308-1 to 308-4, and a respective authentication value 312-1 to 312-4. As shown, the encrypted segments are segments into the ranges of 0-1340 bytes, 1341-2680 bytes, 2681-4020 bytes, and 4021-5360 bytes.

Segmentation engine 118-1 uses the MSS value to segment packet #1 at the correct encryption boundaries. Referring to FIG. 3C, segmentation engine 118-1 may first start at the end of inner header 302 and use the MSS value to determine the end of TLS Auth1 312-1 to form a first packet #1.1. Then, segmentation engine 118-1 determines the second segment by applying the MSS value, which is from the beginning of TLS HD #2 310-2 to the end of TLS Auth2 312-2. Segmentation engine 118-1 similarly applies the MSS value to segment the remaining two encrypted segments with respective encryption headers and authentication values. Then, segmentation engine 118 attaches an inner header 302 and outer header 306 to each segment as shown in FIG. 3D.

Referring back to FIG. 2, at 212, virtual switch 106-1 of hypervisor 102-1 sends the multiple encapsulated packets to destination host 101-2 through PNIC 114-1. For example, PNIC 114-1 may send the multiple encapsulated packets via physical network 116 to hypervisor 102-2 via PNIC 114-2. Destination Host 101-2

Figure 5:
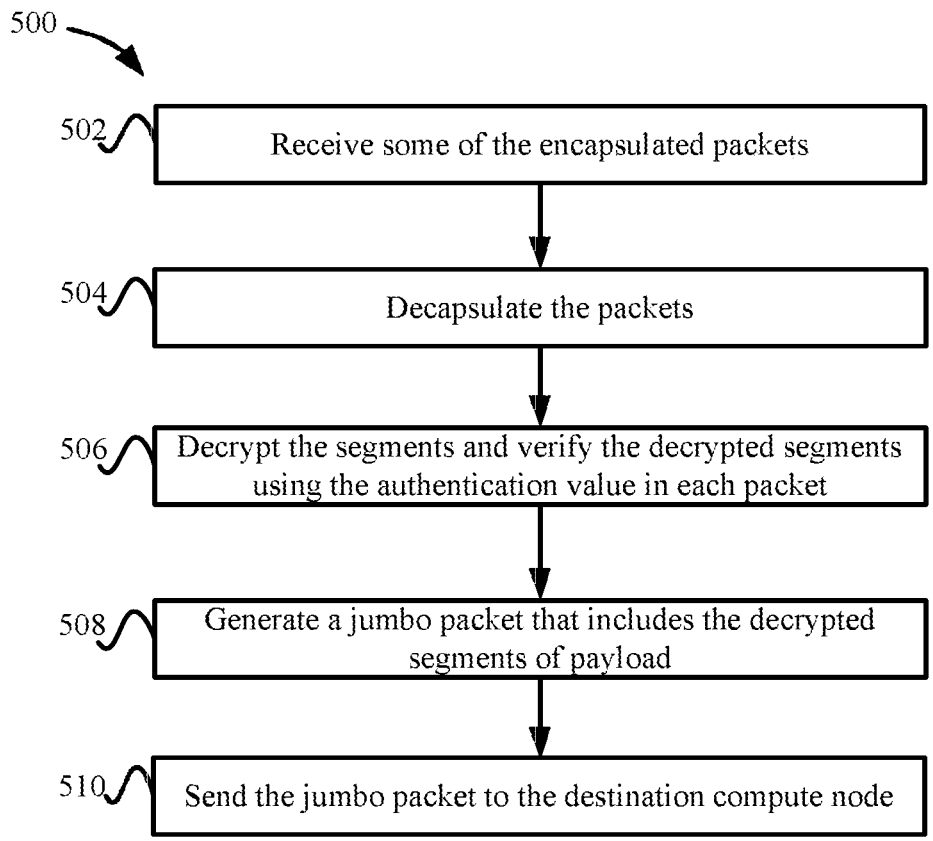
FIG. 5 depicts a simplified flowchart of a method for processing the encapsulated packets at the destination host according to some embodiments.

FIG. 5 depicts a simplified flowchart 500 of a method for processing the encapsulated packets at host 101-2 according to some embodiments. At 502, hypervisor 102-1 receives some of the encapsulated packets. As discussed above, some of the packets may not be received. At 504, tunnel endpoint 110-2 decapsulates the packets that are received. For example, tunnel endpoint 110-2 removes outer header 306 from all of the received packets.

At 506, encryption engine 116-2 decrypts the segments and verifies the decrypted segments using the authentication value in each respective packet. For example, encryption engine 116-2 may generate a signature of the decrypted segment and compare that signature to the authentication value. If the authentication value matches the signature of the decrypted segment, then encryption engine 116-2 determines that the decrypted segment is valid. At 508, virtual switch 106-2 includes the decrypted segments in a jumbo packet for compute node 104-2A. For example, segmentation engine 118-2 (or another process such as virtual switch 106-2) can aggregate the decrypted segments with the inner header 302. Additionally, segmentation engine 118-2 may insert information indicating which segments of the payload (e.g., the byte ranges) were received, such as in the header or in metadata. In other embodiments, compute node 104-2A may determine which segments are received. Then, at 510, virtual switch 106-2 sends the jumbo packet to compute node 104-2A.

Figure 6:
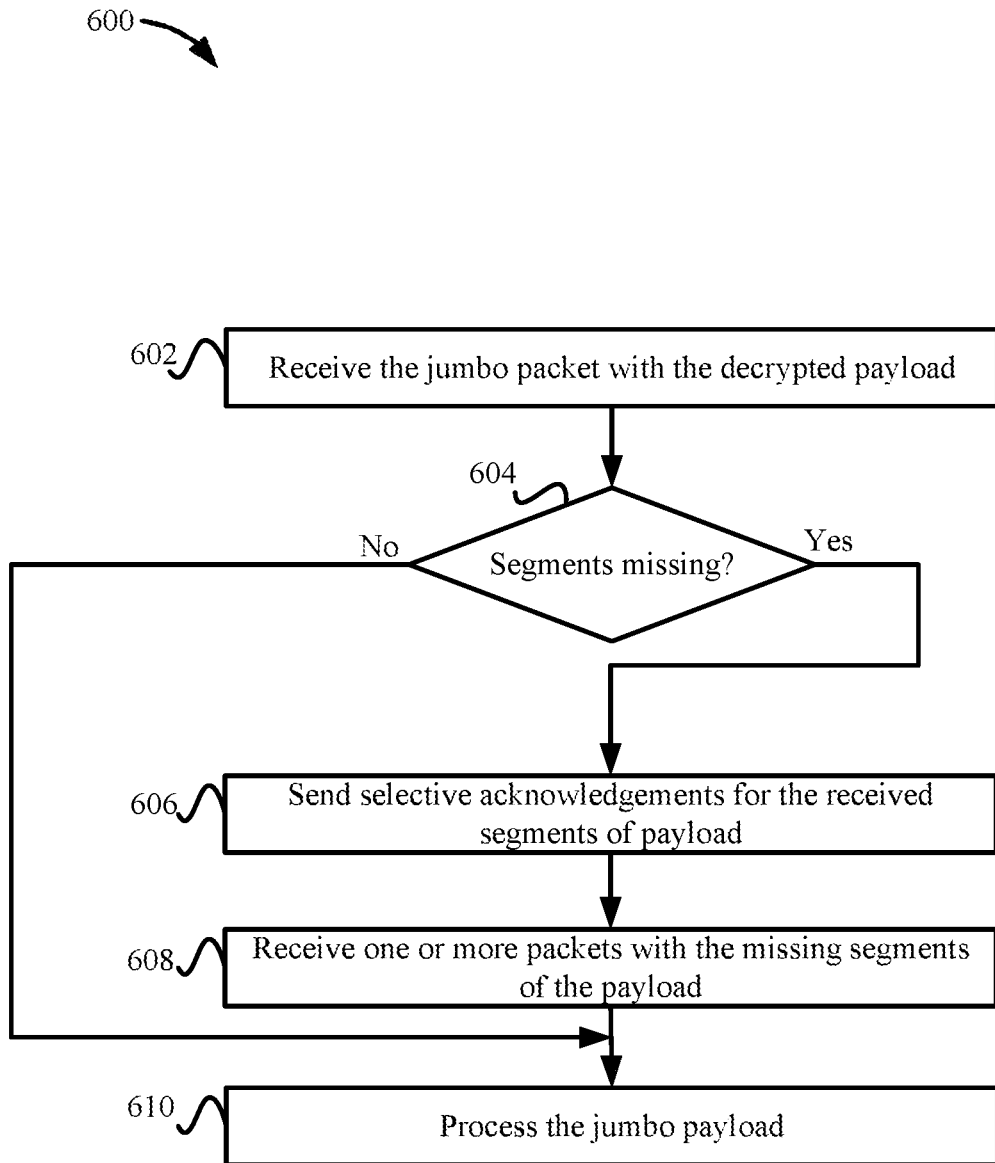
FIG. 6 depicts a simplified flowchart of a method for processing the decrypted segments at a destination compute node according to some embodiments.

FIG. 6 depicts a simplified flowchart 600 of a method for processing the decrypted segments at compute node 104-2A according to some embodiments. At 602, compute node 104-2A receives the jumbo packet with the decrypted segments. At 604, compute node 104-2A determines if any segments of the payload are missing. For example, compute node 104-2A may determine that a segment of payload is missing between a byte range. In some embodiments, compute node 104-2A may examine the byte ranges that were received to determine which byte ranges are received and/or missing. Also, compute node 104-2A may receive information from hypervisor 102-2 indicating that a packet including a segment was lost. If a packet was lost and compute node 104-2A did not receive at least one segment of the payload, at 606, compute node 104-2A sends selective acknowledgements for the received segments of the payload. Then, as will be described in more detail below, the selective acknowledgements are sent to host 101-1, which then sends the missing segments of the payload. Accordingly, at 608, compute node 104-2A receives one or more packets with the missing segments of the payload. Then, at 610, if the missing segments of the payload have been received, compute node 104-2A processes the jumbo payload. Also, if no packets were missing, compute node 104-2A can send acknowledgments for all the segments and also process the jumbo payload.

Selective Acknowledgement Processing at Host 101-1

Figure 7:
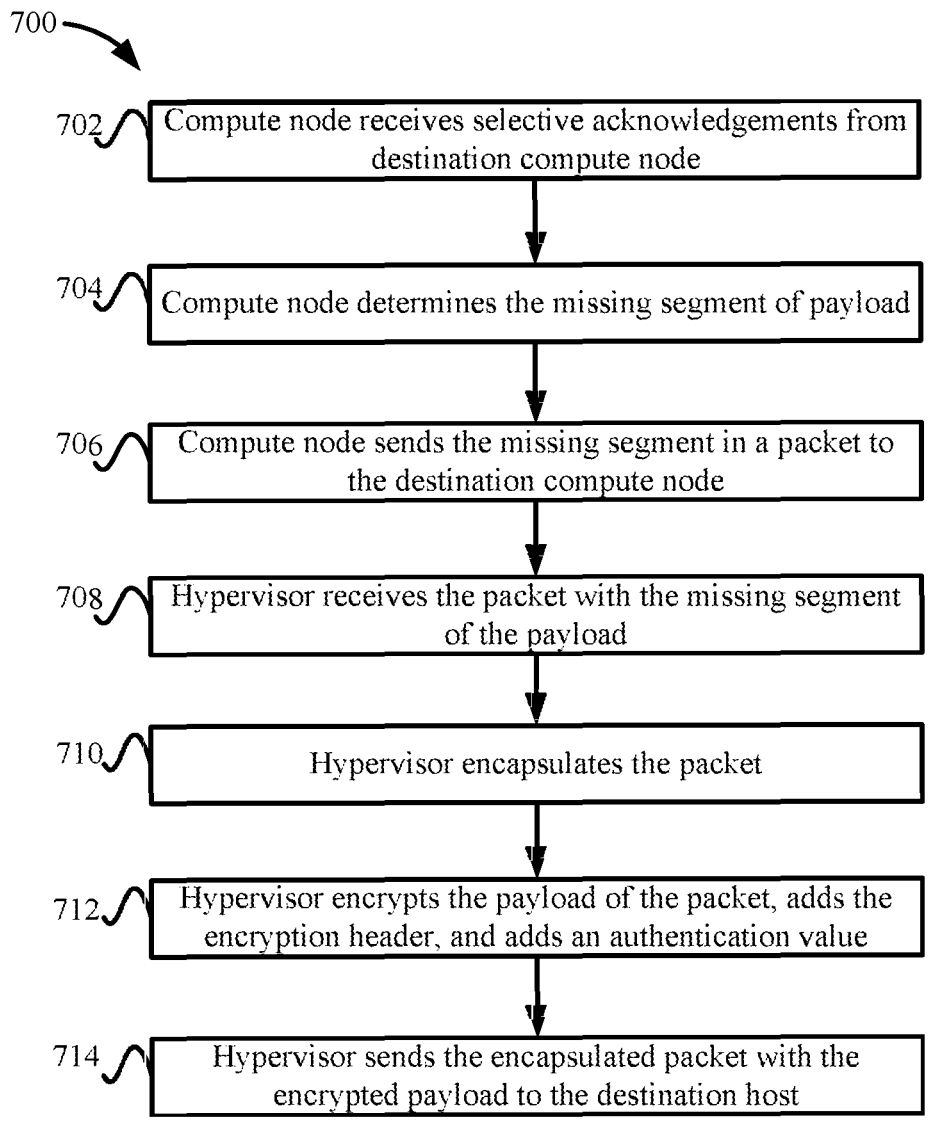
FIG. 7 depicts a simplified flowchart of a method for processing the selective acknowledgements according to some embodiments.

As discussed above, host 101-1 receives the selective acknowledgements and can then re-transmit only the missing segments of the payload. FIG. 7 depicts a simplified flowchart 700 of a method for processing the selective acknowledgements according to some embodiments. At 702, hypervisor 102-1 receives selective acknowledgements from destination compute node 104-2A, such as acknowledgements for segments of payload included in packets #1.1, #1.3, and #1.4 are received. Hypervisor 102-1 may forward the acknowledgments to compute node 104-1A. However, in other embodiments, hypervisor 102-1 may determine which segments are missing and alert compute node 104-1A.

Then, compute node 104-1A may determine the missing segment of data. For example, compute node 104-1A can compare the byte ranges in the selective acknowledgements and determine which byte ranges were not received. In other examples, compute node 104-1A may know how many packets were sent and can determine that an acknowledgement for packet #1.2 was not received. At 704, compute node 104-1A then determines a segment of the payload has been lost. At 706, compute node 104-1A can then send the missing segment in a packet to compute node 104-2A.

At 708, hypervisor 102-1 receives the packet with the missing segment of the payload. Then, at 710, hypervisor 102-1 encapsulates the packet to generate an encapsulated packet. At 712, hypervisor 102-1 encrypts the payload of the packet, adds an encryption header, and adds an authentication value. The packet including the missing segment of the payload may be smaller than the MTU value and thus hypervisor 102-1 does not need to segment the payload. However, if multiple segments of the payload are missing, it is possible that compute node 104-1 may send a packet including multiple segments, which would be over the MTU size. In this case, hypervisor 102-1 may segment the missing payload into multiple packets as described above.

At 714, assuming there was only one missing segment, hypervisor 102-1 sends the encapsulated packet with the encrypted segment, encryption header, and authentication value to host 102-2. Hypervisor 102-2 can then de-capsulate the packet, decrypt the missing segment of the payload, and send the missing payload to compute node 102-2 as was described before.

Accordingly, some embodiments provide an efficient process to handle missing packets. Due to the varying length of the headers, hypervisor 102 can dynamically determine the MSS value and also the encrypted segment value. This allows hypervisor 102 to segment a packet along proper segmentation boundaries to generate multiple encapsulated packets that each include an encryption header and authentication value. Thus, a destination hypervisor 102-2 can decrypt the encrypted segments individually and only the missing segments need to be re-sent.

Some embodiments described herein can employ various computer-implemented operations involving data stored in computer systems. For example, these operations can require physical manipulation of physical quantities-usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, some embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, some embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

What is claimed is:

1. A method comprising:
   receiving, at a first host, a first packet from a first compute node that is being sent to a second compute node of a second host, the first packet including a first header and a payload, wherein the payload is larger than a maximum transmission unit size for sending packets to the second compute node;
   encapsulating the first packet with an outer header;
   analyzing a length of at least a portion of the outer header in determining a size of an encrypted segment of the payload to include in a plurality of packets;
   forming the plurality of packets, wherein each packet in the plurality of packets includes an encrypted segment of the payload, a respective encryption header for the respective encrypted segment, and a respective authentication value for the respective encrypted segment, wherein the payload of the first packet is segmented to form a plurality of encrypted segments based on the size of the encrypted segment;
   sending the plurality of packets to the second host using the outer header;
   receiving an indication that one of the plurality of packets was not received by the second compute node; and
   sending a second packet including the encrypted segment that was not received in the one of the plurality of the packets to the second compute node.

2. The method of claim 1, wherein segments other than the encrypted segment that was not received are not resent to the second compute node.

3. The method of claim 1, wherein analyzing comprises:
   calculating a maximum segment size based on the maximum transmission unit, the first header, and the at least the portion of the outer header; and
   calculating the size of the encrypted segment based on the maximum segment size, a size of the encryption header for the encrypted segment, and a size of the authentication value for the encrypted segment.

4. The method of claim 3, further comprising:
   encrypting segments of the payload in the first packet based on the size of the encrypted segment to include in the plurality of packets;
   inserting the respective encryption header and the respective authentication value for the respective encrypted segment in the payload of the first packet; and
   segmenting the payload of the first packet based on the maximum segment size to form a plurality of payloads for the plurality of packets.

5. The method of claim 1, wherein:
   the first compute node is a virtualized computing instance (VCI) supported by virtualization software running on the first host.

6. The method of claim 1, further comprising:
   executing, with the first host, a hypervisor comprising a virtual switch;
   creating, with the virtual switch, a software-defined logical overlay network on which the compute node resides, the overlay network comprising:
      a first tunnel endpoint corresponding to the first compute node and having a first address; and
      a second tunnel endpoint corresponding to the second compute node and having a second address;
   identifying the first address and the second address with the outer header.

7. The method of claim 6, wherein:
   forming the plurality of packets comprises:
      generating a plurality of payload segments by segmenting the payload of the first packet;
      encrypting, by an encryption engine of the hypervisor, each of the plurality of payload segments;
      adding, by the encryption engine, associated encryption headers and authentication values for the plurality of payload segments;
      generating, with a segmentation engine of the hypervisor, the plurality of packets from the plurality of payload segments and associated encryption headers and authentication values.

8. A non-transitory computer-readable storage medium containing instructions, that when executed, control a computer system to be configured for:
receiving, at a first host, a first packet from a first compute node that is being sent to a second compute node of a second host, the first packet including a first header and a payload, wherein the payload is larger than a maximum transmission unit size for sending packets to the second compute node;
encapsulating the first packet with an outer header;
analyzing a length of at least a portion of the outer header in determining a size of an encrypted segment of the payload to include in a plurality of packets;
forming the plurality of packets, wherein each packet in the plurality of packets includes an encrypted segment of the payload, a respective encryption header for the respective encrypted segment, and a respective authentication value for the respective encrypted segment, wherein the payload of the first packet is segmented to form a plurality of encrypted segments based on the size of the encrypted segment;
sending the plurality of packets to the second host using the outer header;
receiving an indication that one of the plurality of packets was not received by the second compute node; and
sending a second packet including the encrypted segment that was not received in the one of the plurality of the packets to the second compute node.

9. The non-transitory computer-readable storage medium of claim 8, wherein segments other than the encrypted segment that was not received are not resent to the second compute node.

10. The non-transitory computer-readable storage medium of claim 8, wherein analyzing comprises:
calculating a maximum segment size based on the maximum transmission unit, the first header, and the at least the portion of the outer header; and
calculating the size of the encrypted segment based on the maximum segment size, a size of the encryption header for the encrypted segment, and a size of the authentication value for the encrypted segment.

11. The non-transitory computer-readable storage medium of claim 10, further comprising:
encrypting segments of the payload in the first packet based on the size of the encrypted segment to include in the plurality of packets;
inserting the respective encryption header and the respective authentication value for the respective encrypted segment in the payload of the first packet; and
segmenting the payload of the first packet based on the maximum segment size to form a plurality of payloads for the plurality of packets.

12. The non-transitory computer-readable storage medium of claim 8, wherein:
the first compute node is a virtualized computing instance (VCI) supported by virtualization software running on the first host.

13. The non-transitory computer-readable storage medium of claim 8, further comprising:
executing, with the first host, a hypervisor comprising a virtual switch;
creating, with the virtual switch, a software-defined logical overlay network on which the compute node resides, the overlay network comprising:
a first tunnel endpoint corresponding to the first compute node and having a first address; and
a second tunnel endpoint corresponding to the second compute node and having a second address;
identifying the first address and the second address with the outer header.

14. The non-transitory computer-readable storage medium of claim 13, wherein:
forming the plurality of packets comprises:
generating a plurality of payload segments by segmenting the payload of the first packet;
encrypting, by an encryption engine of the hypervisor, each of the plurality of payload segments;
adding, by the encryption engine, associated encryption headers and authentication values for the plurality of payload segments;
generating, with a segmentation engine of the hypervisor, the plurality of packets from the plurality of payload segments and associated encryption headers and authentication values.

15. A first host comprising:
one or more computer processors; and
a non-transitory computer-readable storage medium comprising instructions, that when executed, control the one or more computer processors to be configured for:
receiving a first packet from a first compute node that is being sent to a second compute node of a second host, the first packet including a first header and a payload, wherein the payload is larger than a maximum transmission unit size for sending packets to the second compute node;
encapsulating the first packet with an outer header;
analyzing a length of at least a portion of the outer header in determining a size of an encrypted segment of the payload to include in a plurality of packets;
forming the plurality of packets, wherein each packet in the plurality of packets includes an encrypted segment of the payload, a respective encryption header for the respective encrypted segment, and a respective authentication value for the respective encrypted segment, wherein the payload of the first packet is segmented to form a plurality of encrypted segments based on the size of the encrypted segment;
sending the plurality of packets to the second host using the outer header;
receiving an indication that one of the plurality of packets was not received by the second compute node; and
sending a second packet including the encrypted segment that was not received in the one of the plurality of the packets to the second compute node.

16. The apparatus of claim 15, wherein segments other than the encrypted segment that was not received are not resent to the second compute node.

17. The apparatus of claim 15, wherein analyzing comprises:
calculating a maximum segment size based on the maximum transmission unit, the first header, and the at least the portion of the outer header; and
calculating the size of the encrypted segment based on the maximum segment size, a size of the encryption header for the encrypted segment, and a size of the authentication value for the encrypted segment.

18. The apparatus of claim 17, further configured for:
encrypting segments of the payload in the first packet based on the size of the encrypted segment to include in the plurality of packets;

inserting the respective encryption header and the respective authentication value for the respective encrypted segment in the payload of the first packet; and segmenting the payload of the first packet based on the maximum segment size to form a plurality of payloads for the plurality of packets.

19. The apparatus of claim 15, wherein the first compute node is a virtualized computing instance (VCI) supported by virtualization software running on the first host.

20. The apparatus of claim 15, further comprising:

executing, with the first host, a hypervisor comprising a virtual switch;

creating, with the virtual switch, a software-defined logical overlay network on which the compute node resides, the overlay network comprising:

a first tunnel endpoint corresponding to the first compute node and having a first address; and a second tunnel endpoint corresponding to the second compute node and having a second address;

identifying the first address and the second address with the outer header.

21. The apparatus of claim 20, wherein:

forming the plurality of packets comprises:

generating a plurality of payload segments by segmenting the payload of the first packet;

encrypting, by an encryption engine of the hypervisor, each of the plurality of payload segments;

adding, by the encryption engine, associated encryption headers and authentication values for the plurality of payload segments;

generating, with a segmentation engine of the hypervisor, the plurality of packets from the plurality of payload segments and associated encryption headers and authentication values.

* * * * *